Jan. 12, 1965     M. S. MERRILL ETAL     3,164,994
BALANCING APPARATUS
Filed June 15, 1959     3 Sheets-Sheet 2
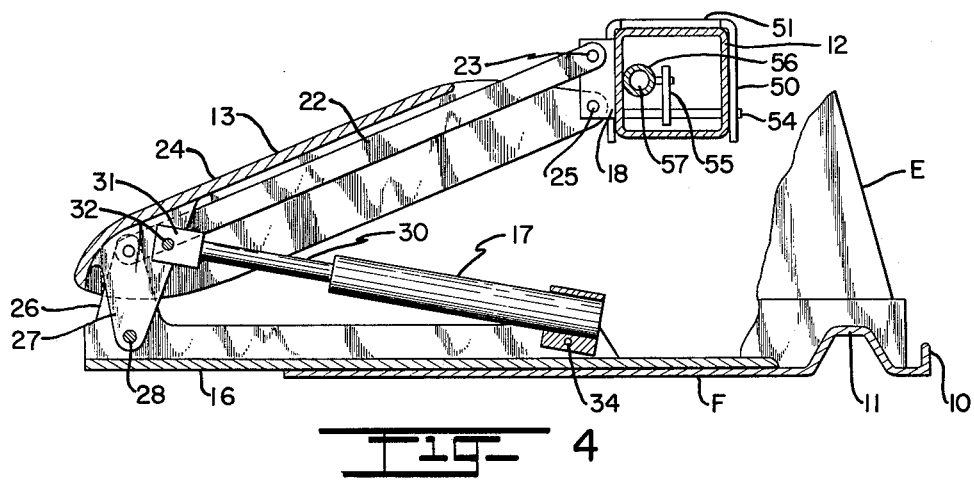
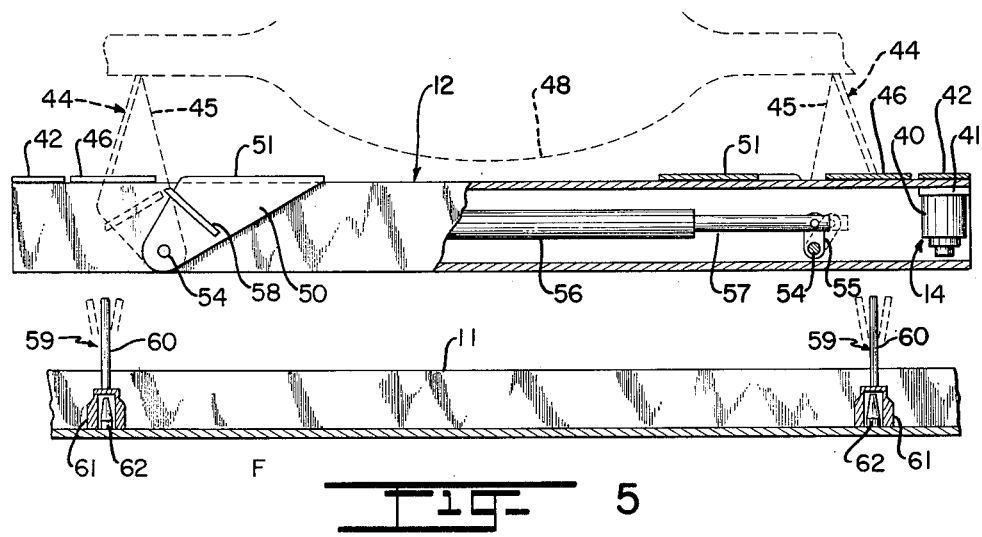
INVENTOR.
MARCELLUS S. MERRILL
LOWELL H. ERICKSON
BY
Philip H. Sheridan
ATTORNEY

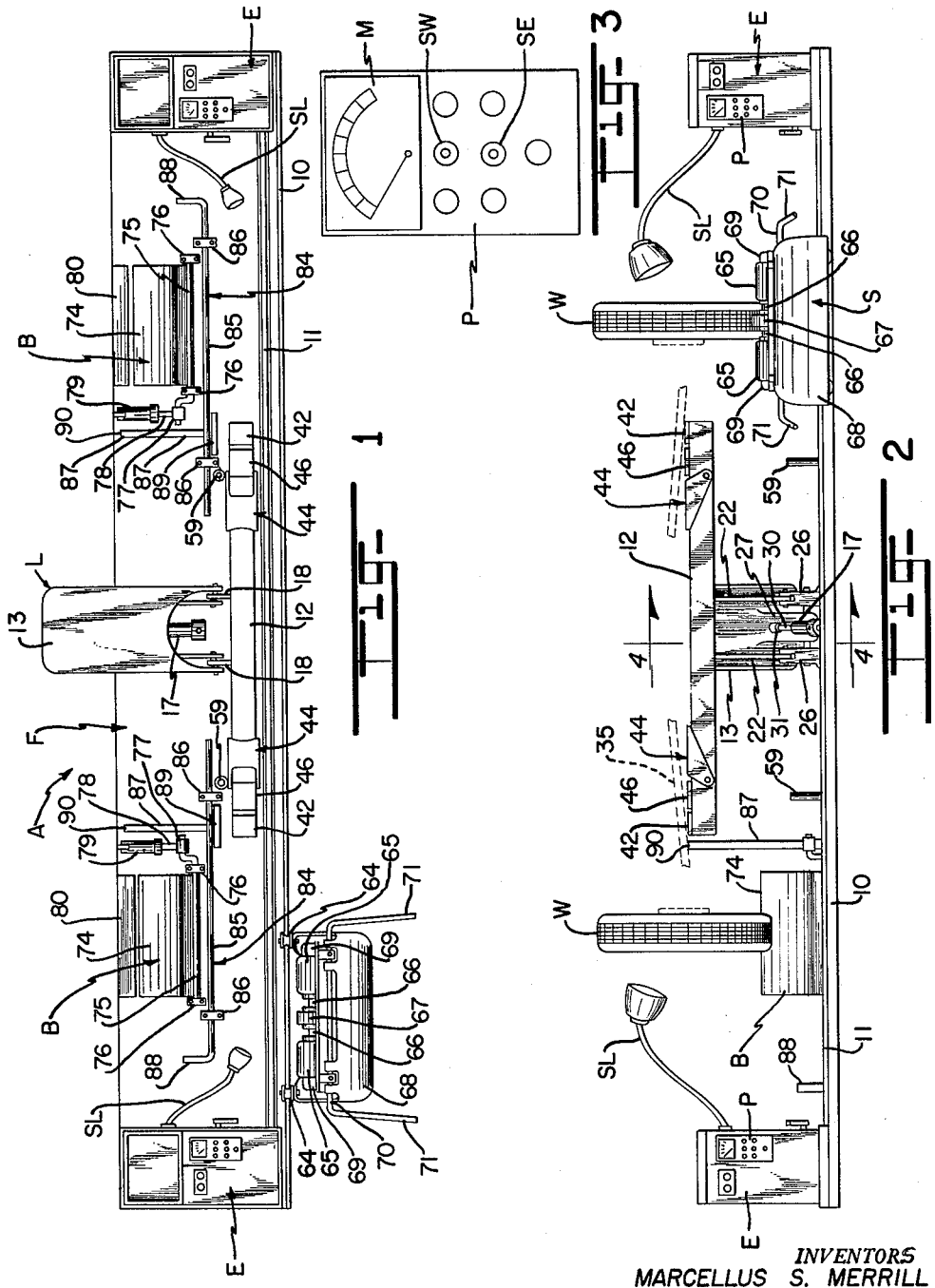

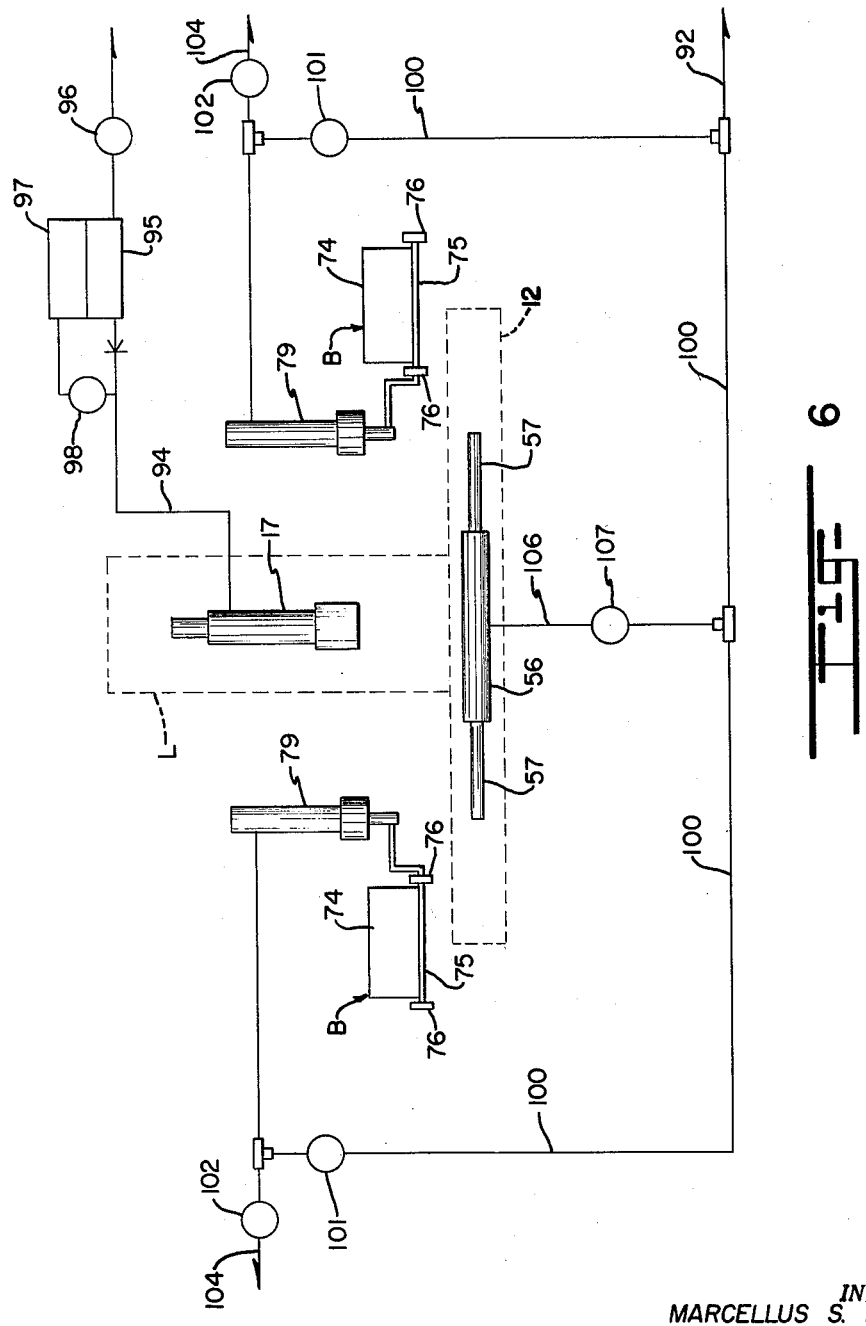

United States Patent Office 3,164,994
Patented Jan. 12, 1965

3,164,994
BALANCING APPARATUS
Marcellus S. Merrill, 335 Colorado Blvd., Denver, Colo., and Lowell H. Erickson, Denver, Colo.; said Erickson assignor to said Merrill
Filed June 15, 1959, Ser. No. 820,194
7 Claims. (Cl. 73—457)

This invention relates to the detection and correction of static and dynamic unbalance in a rotating body; and more particularly relates to a novel and improved balancing apparatus for correcting the static and dynamic unbalance in the wheels of a vehicle.

Balancing apparatus is customarily employed in the balancing of rotating bodies, such as for example, the wheels of an automobile in such a manner that the wheels can be balanced in mounted position on the automobile in a minimum of time. To carry out this operation, an installation may be employed such as that shown and described in our prior Patent No. 2,798,379 granted July 9, 1957, whereby each companion pair of wheels on an automobile may be lifted for selective rotation so that through the medium of spaced vibration pickups together with means selectively responsive to the vibrations transmitted to either pick-up, the nature of unbalance of each wheel may be determined, following which corrective measures may be taken to balance the wheel.

It is a principal object of the present invention to provide for an improved balancing apparatus of the type shown and described in the above referred to Patent No. 2,798,379, with especial reference to a more simplified and compact construction and arrangement, conformability for use in restricted locations for the servicing of various sizes and types of vehicles, and a single simplified apparatus which may be employed in the successive balancing of the front and rear companion wheels on a vehicle.

It is another object of the present invention to provide for the rapid balancing of a rotating body such as a vehicle wheel and moreover to carry out the rapid and efficient balancing in succession of the front and rear companion wheels on an automobile with a minimum alteration of equipment, notwithstanding the type of power transmission employed for driving the rear wheels such as the more modern differential lock mechanisms.

It is a further object to provide for a unitary lift-support and vibration pickup unit which is so constructed and arranged as to provide for increased sensitivity to vibrations and which is adaptable for testing both front and rear end wheel units of a vehicle.

It is a still further object to provide for an improved vehicle lift component incorporating in a single unit the necessary vibration pickups and supports in such a way so as to make the entire component more compact, flexible for various operations, and with increased sensitivity to vibrations transmitted, in the balancing of vehicle wheels.

It is an additional object to provide for a way of effectively blocking out extraneous peaks in vibrations developed in the balancing of vehicle wheels together with an associated unitary lift support and vibration pickup unit which is capable of increased sensitivity to vibrations developed by unbalancing forces in vehicle wheels.

The above and other objects of the present invention will become more apparent from the following detailed description taken together with the accompanying drawings, in which:

FIGURE 1 is a plan view of an improved balancing apparatus in accordance with the present invention;

FIGURE 2 is an elevational view of the balancing apparatus shown in FIGURE 1 and illustrating the manner of disposition of a pair of companion wheels of an automobile thereon;

FIGURE 3 is a front view of an instrument panel which may be employed to accomplish the necessary switching for determining the extent of unbalance in the testing of a vehicle wheel;

FIGURE 4 is a detailed section view taken on line 4—4 of FIGURE 2;

FIGURE 5 is a detailed view, partially in section, of the left support and base arrangement; and FIGURE 6 is a schematic diagram of the control unit which may be employed in conjunction with the operation of the preferred form of balancing apparatus.

Referring more particularly to the drawings, there is shown by way of illustrative example in FIGURES 1 and 2 a balancing apparatus A broadly comprised of a base or foundation F having a lateral guide portion 10, a combination lift support and pickup unit L having a pickup bar 12 which is pivotally mounted through means 13 for selectively raising and lowering the pickup bar, a spinner S which is laterally movable along the lateral guide portion 10 for disposition in alignment with the vehicle wheel to be rotated, and brake means B positioned in alignment for selective engagement with each of the companion wheels W. In accordance with the present invention, the balancing apparatus A is designed to detect unbalancing forces in each of the vehicle wheels W, as it is being rotated, through vibration sensitive means in the form of pickups 14 as shown in FIGURE 5 which are located at opposed ends of the pickup bar 12 to convert the vibration frequencies developed by the unbalancing forces in the vehicle wheel into electrical impulses of similar magnitude and to relay these impulses to an interpreter unit as illustrated at E in the figures to indicate the extent and character of the unbalancing forces.

As a preliminary to a more detailed discussion of the individual features and advantages of the present invention, it is to be noted by reference to the above mentioned patent that in a balancing operation of this nature, the procedure generally followed is to spin by means of the spinner S the individual wheel to be balanced at a rate of speed above its resonant or critical speed, then allow it to coast down through the critical speed at which point a very small unbalancing force in the wheel will be operative to produce and develop very large amplitudes of vibration which will be carried or transmitted into the vehicle body and picked up by the vibration sensitive means 14. The circuitry in the system is designed such that to record kinetic or static unbalancing forces in the wheel the vibrations are picked up by closing the circuit, through a switch SW on panel P, to the pickup 14 adjacent to the wheel. The signals developed by these vibrations at the critical speed are then relayed into the interpreter unit E and may be read and indicated on an unbalance meter M. In this connection a sensitivity switch SE is provided on the panel P to control the amplification of signals from the pickups. Through a stroboscopic lamp SL a check point may be located on the exterior of the vehicle wheel at the critical speed of rotation which will have the appearance of standing still since the light is flashed once each revolution to pick up that particular point. After the position of the check point has been noted the wheel can than be braked to a stop by means of the brake B. The static unbalanced condition of the wheel may then be corrected by addition of a weight thereto. Further balance checks of the wheel will indicate additional corrective measures to be taken by the addition or variation in the weight placed on the wheel until negligible or no unbalance is indicated on the meter. To record dynamic unbalance the pickup switch SW may be operated so that the vibration sensitive pickup 14 opposite to the wheel being spun is connected to the interpreter unit E with the pickup 14 adjacent to the wheel cut out from the circuit. Again, the induced voltages caused by vibrations developed will be recorded on the meter M and the stroboscopic lamp will be caused to flash each revolution whereupon in a similar manner a check point may be located and the necessary correction made. From this it will be seen that it is necessary to space the vibration sensitive means apart and to make them selectively and individually responsive to static and dynamic unbalancing forces in the respective opposed wheels; also, the vibration sensitive means must be so mounted as to be extremely sensitive to the vibrations developed while at the same time it supports the weight of the vehicle resting thereon.

In accordance with the present invention, the entire balancing apparatus is made extremely compact and greatly simplified, and more important, is conformable for the testing of both the front and rear companion wheels, for example of an automobile, and in a way such that with minimum adjustment the apparatus is capable of being highly sensitive to and accurately responsive to those vibrations developed by the unbalancing forces in the vehicle wheel. To this end, the foundation F is in the form of a thin, flat base support plate which is dimensioned to extend a length considerably greater than that of the tread of a passenger car. Extending along the forward longitudinal edge of the base or foundation F is lateral guide portion 10 consisting of an upstanding guide rail for disposition of the spinner S thereon, together with a chock 11 in the form of a raised portion spaced rearwardly of the guide rail and extending the length of the base. The base plate F is preferably attached into the concrete flooring in order to serve as a support for the component parts of the balancing apparatus and to provide for the desired alignment and attachment of the various component parts comprising the installation.

A primary feature of the present invention is the construction and arrangement of the lift support and pickup unit L which is generally T-shaped to form a vertically adjustable, horizontally extending pickup bar 12 disposed in hinged relation at the forward end of a rearwardly extending lift member 13. The lift member 13 is in turn pivotally mounted at its rearward end upon a base plate 16 which is secured to the foundation F. To selectively raise and lower the lift member 13 and connected pickup bar 12, means preferably in the form of a cylinder 17 is provided for connection to the underside of the lift member adjacent to its lower end and which extends angularly downwardly and forwardly therefrom for attachment into the base plate 16.

The pickup bar 12 preferably forms a housing for the pickups 14 and is composed of a heavy duty metallic material with the top surface thereof disposed when lifted for engagement with the under side of the vehicle. The pickup bar 12 is of a length such that it will extend across the greater width of the vehicle between the wheels W so that with the pickup bar centrally positioned between the vehicle wheels the vibration sensitive means 14 positioned at either end of the bar will be located in a position relatively close to the wheels W. In order to provide for a firm but somewhat resilient connection of the bar 12 into the base F, a pair of spaced vertically extending mounting plates 18 are secured to the back side portion of the bar intermediately thereof for connection of a pair of correspondingly spaced rods 22 of the lift member 13 by connecting pins 23, which connection is made adjacent the upper end of the vertical plates 18. The lower side portions of a generally U-shaped enclosure 24 of the left member are independently connected to the plates adjacent the lower edges thereof by means of pivot pins 25. At the lower end of the lift member, the connecting rods 22 are connected into upstanding brackets 26 projecting from the base plate 16, and the enclosure 24 is connected to a bracket 27 such as by a pivot pin 28. The lift cylinder 17 includes a piston rod 30 having an enlarged end portion 31 for pivotal connection into the bracket 27 by pivot pin 32, and the lower closed end of the cylinder portion is similarly pivotally connected by a pin 34 into the base plate 16. In this manner, upon actuation of the cylinder 17 in a manner to be described, the pickup bar 12 is urged upwardly and somewhat rearwardly through the lift member 13 into a position, for example if the front wheels are to be tested, engaging the A-frame of the vehicle as represented at 35 in FIGURE 2.

To provide a housing for the vibration sensitive means 14 the pickup bar 12 is preferably in the form of a hollow oblong portion which is mounted in hinged relation as described such that the bar extends horizontally for engagement with and lifting against the under side of the vehicle. The vibration sensitive means 14 are preferably positioned at opposed ends of the bar 12 within the chamber formed by the bar to selectively receive vibrations developed by unbalancing forces in the vehicle wheels and to translate the vibrations developed into a signal which is relayed to an interpreter or electronic control unit E. A typical vibration pickup which may be employed is that shown and described in Patent No. 2,798,379 which is constituted broadly of a seismic mass, flexure leaf springs, permanent magnets and a core and coil arrangement mounted within the housing of the pickup unit. Just briefly, the voltage induced into the pickup coil is an alternating voltage which is relayed through conductors into the proper control units. In the figures, only housing portions 40 are illustrated and it will be noted that the pickups of the present invention are mounted somewhat differently in that the mounting covers 41 for the pickups are rigidly secured to the under surface of the top plate of the pickup bar 12, although various different forms of mounting may be employed such as that shown in our earlier, above mentioned patent. At the same time, the pickup bar 12 itself is resiliently mounted for lifting and lowering in a unique way such that the vibrations developed in the vehicle are transmitted directly through the pickup bar for sensing by the pickup units 14, and in this relation the indirect pivotal mounting of the pickup bar together with the central connection employed between the lift member 13 and pickup bar 12 cooperate with the hollow form of the bar to effectively transmit vibrations therethrough.

Mounted on the top plate of the pickup bar 12 are end plates 42 secured directly over each of the pickups 14 for direct engagement with the under side of the vehicle, together with straddle support members 44 each being made up of a flipper or fin portion 45 and support plate 46. Essentially, the straddle support members 44 are spaced and constructed for selected engagement with the axle of the rear end vehicle wheels in such a way as to provide for disposition in spaced relation of the pickup bar 12 with respect to the differential housing of the vehicle as illustrated at 48 in FIGURE 5. Each of the flippers 45 includes space generally triangular side braces 50 which are pivotally connected at their lower ends to the front and back plates of the pickup bar 12, respectively, and are interconnected along the top edges thereof by a top plate 51. The flippers 45 are designed so that the braces 50 may swing between a horizontal down position with the top plates 51 resting on the pickup bar to an upstanding position with the bottom edges only of each of the plates 51 resting on the plates 46. To provide for actuation of the flippers between the horizontal and upstanding positions, a pivotal bearing shaft 54 extends through the braces 50 and bar 12, and to each of the bearing members 54 there is rigidly connected an arm 55 with a cylinder 56 mounted within the pickup bar for horizontal extension between the uppermost ends of the arms 55. To cause swinging movement of the flippers 45 about the bearing members 54, the arms 55 are rigidly attached to the latter and the cylinder 56 is in turn provided with a pair of piston rods 57 for pivotal attachment to each of the respective arms 55. Upon injection of fluid pressure into the cylinder 56, piston heads, not shown, will be caused to force the rods 57 outwardly to thereby effect a corresponding outward swinging movement of the arms 55 together with the flippers 45 into the upstanding position.

The flippers 45 are normally selectively actuated into the upstanding position only after the vehicle is positioned with the rear end axle portion aligned in position directly above the pickup bar 12 in preparation for the balancing operation. With the pickup bar 12 in downward position the flippers are moved into the upstanding bracing position whereupon the pickup bar is moved until the flippers have engaged the underside of the axle portion in spaced relation to the differential housing 48. The lift operation is then continued until the wheels are raised off the floor. In order to release the flippers and cause them to return to the horizontal position, dogs 58 are provided on the inside lower portion of one of the braces 50 for each flipper and the dogs protrude rearwardly from the intermediate portions of the flippers. The dogs are thus disposed to move into engagement with upstanding release members 59. Release members 59 each include an abutment rod 60 having an inverted cup-shaped head 61 centered on a pin 62. As the dogs 58 engage the tips of the rods 60 they will be forced inwardly together with the flippers until the greater weight of the flippers is moved beyond the pivot point at the bearing members 54 whereupon the flippers will fall into resting position with the piston rods 57 being free to return to inward position within the cylinder 56 in preparation for the next balancing operation. It is to be noted that the abutment rods 60 and associated head portions 61 are loosely mounted on the centering pin 62 such that the rods will have some give and will be permitted to rock away from engagement with the catch portions in the event the flippers are moved to the upstanding bracing position before the pickup bar 12 is lifted to a height above the rods 60.

The spinner S is mounted by means of rollers 64 upon the lateral guide portion 10 such that the entire spinner assembly is slidable laterally along the base into position in facing relation with a vehicle wheel resting between the brake portion B and chock 11. The spinner S is suitably comprised of a pair of motors 65 having a common drive shaft 66 extending therebetween with a spinning wheel 67 splined to the drive 66 for rotation. The motors 65 and spinning wheel 67 are preferably mounted within a housing 68 which is open at one side so that the motors and spinning wheel are free to pivot outwardly and upwardly into engagement with the vehicle wheel to be tested. This may be accomplished by journaling the ends of the motor housing to arms at each end of a motor mounting bracket 69 depending from an overhead pivot shaft 70, the latter including a pair of rearwardly extending lever arms 71 which by movement downwardly will cause the bracket 69 and connected spinner assembly to swing forwardly and upwardly about the shaft 70. In a well known manner, the spinner assembly S is employed to impart rotation to a vehicle wheel to be tested to a speed considerably above its resonant or critical speed whereupon lowering of the spinner assembly the vehicle wheel is permitted to coast down through the critical speed of rotation, at which point the unbalancing forces in the vehicle wheel will generate resonant frequencies which can be easily picked up by the vibration sensitive means 14 and relayed into the electronic control units E.

In order to selectively brake rotation of the wheel being tested so that weights can be applied thereto, brake means B are preferably permanently attached in hinged relation to the base F on either side of the central lift portion L. Each brake assembly is broadly comprised of a braking surface 74 secured at its forward edge to a crank arm 75 which is hinged by means of plates 76 to the base. The crank end of the arm 75 is preferably actuated through a bearing 77 mounted at the end of a rod 78 of a fluid actuated cylinder 79 whereby outward forcing of the rod will cause the arm 75 and braking surface 74 to swing upwardly and forwardly into braking contact with the tread portion of the vehicle tire. In order to relieve the braking surfaces 74 from any tendency to work against the crank arm as the vehicle is driven over the surfaces, permanently attached plates 80 are disposed behind each of them so that the vehicle wheels will first contact the plates 80 and then roll evenly onto the brake assemblies B. In testing position, it will be evident that upon selective movement and pivoting of the braking surfaces upwardly and forwardly through actuation of the cylinder 79, the braking surfaces will come into engagement with the tires.

It will be evident from the above that a single balancing apparatus of the type described is adaptable for the testing of either the front or rear companion wheels of a vehicle, since in the testing of the front vehicle wheels the flippers 45 are merely permitted to lie flat against the top plate of the pickup bar and the pickup bar may be selectively lifted preferably into engagement with the A frame of the vehicle. In conducting rear end wheel balancing operations, the flippers 45 are selectively raised so as to straddle the differential in which event vibrations are transmitted through the flippers into the pickup bar to the pickup units 14.

In many recent model cars, however, there are employed for transmission of power to the rear wheel a differential lock mechanism whereby the wheels are locked for simultaneous rotation making it virtually impossible to test one wheel while holding the other wheel stationary. In the present invention, extraneous vibrations introduced during the testing operation as a result of the simultaneous rotation of both wheels are effectively eliminated by the use of a block arrangement as indicated generally at 84, with one each being provided next to the ends of pickup bar 12. Each of the blocks 84 includes a laterally extending actuating rod 85 disposed both for pivotal and sliding movement on the base F through clamps 86, and with a block arm 87 disposed for rearward extension from the rod 85 together with a lever arm 88 extending rearwardly from the opposite end of each rod. Stops 89 are positioned on the base in front of arms 87 to limit their upward swinging movement into vertical disposition so as to form a rigid support. To establish secure engagement with the underside, the arms 87 are also preferably provided with arcuate bearing surfaces or cradles 90 at their free ends to thus permit the axle or A frame of the vehicle to rest securely thereon without shifting. It will be noted that in this arrangement the vehicle is first lifted to the desired height by means of the lift support L whereupon an arm 87 is swung into upstanding position to engage the axle adjacent to the wheel not being tested, after which the lift support is lowered so that the frame or axle portion of the vehicle rests on the arm. At this point, the lift support is again raised to contact the axle portion. Through the selective utilization of a blocking arm 87 with the vehicle resting thereon, each arm will operate to absorb extraneous vibrations which would otherwise be induced into the highly sensitive pickups when both wheels are being simultaneously rotated, and by sliding the rod 85 each arm may be shifted laterally for engagement with the axle portion. Preferably, the arm should support the axle portion as close to the inside of the wheel, not being tested, as possible in order to most effectively absorb vibrations from that wheel. Of course, other means may be employed to selectively absorb extraneous peaks of vibrations such as hydraulic or telescoping jack members.

In FIGURE 6 there is illustrated the controls which are operative to selectively energize the various parts of the balancing apparatus of the present invention.

The control system preferably consists of cylinders which are pneumatically actuated by means of an air supply line 92, with the exception of the lift cylinder 17, the latter being actuated by means of hydraulic fluid through inlet line 94 from an air operated hydraulic pump 95. The pump 95 is preferably air operated by means of air directed for flow through air valve 96 to withdraw hydraulic fluid from a suitable reservoir 97 for flow through the inlet line 94. The cylinder 17 may be of the single acting type whereby release of pressure in the inlet line 94 through a release valve 98 will cause return flow of the fluid due to the weight of the lift support assembly L, together with the vehicle resting thereon.

The air supply system, in addition to the main supply line 92, includes a pair of auxiliary lines 100 for delivery of air into the brake assemblies B. The lines 100 constitute pressure lines whereupon opening of brake valves 101 and closing of exhaust valves 102 fluid will be caused to flow into the cylinder ends of each of the respective brake assemblies to cause upward movement of the braking surfaces 74 into engagement with the tire of the vehicle wheel to be tested. In order to selectively lower each braking surface, 74, the brake valve for the assembly is closed and exhaust valve 102 is opened for release of the compressed air through return lines 104. Similarly, a pressure line 106 is led from the air supply whereupon opening of the valve 107, compressed air is caused to flow into the cylinder 56 to cause movement of the straddle supports 44 into upstanding position. In this connection it is greatly preferred to employ what may be generally termed as loose fitting pistons 57 so that excess air pressure introduced will escape around the piston for exhaust through the piston rod end of the cylinder.

The electrical controls employed together with the electrical instrumentation in the control unit E is essentially the same as that shown and described in our Patent No. 2,798,379 and reference may be had to that patent for the details of this phase of the apparatus. However, the operation of the balancing apparatus of the present invention will be described with particular emphasis given to the essential features, it being understood that the details of the electrical circuitry are as set forth in the patent above referred to. To carry out balancing of the front wheels of the vehicle, the vehicle, is driven onto the base F with the front wheels positioned against the chock 11 and just forward of the braking surfaces 74 such that the A frame of the vehicle is centered over the lift support L. Through actuation of the cylinder 17 for the lift support the front end of the vehicle is then raised through engagement of the pickup bar 12 with the A frame and is raised to a height such that the wheels W are spaced above the base F. If desired, the bracket arms 87 may then be pivoted upwardly and the lift support L lowered so that the A frame is resting primarily on the bracket arms 87 but with the top plate of the pickup bar 12 still firmly engaging the underside of the vehicle. The spinner S is then rolled into position in alignment with the wheel to be tested and by lowering lever arm 71 the spinner wheel 67 will be raised into contact with the wheel. This will cause closing of the motor control switch so as to initiate rotation of the wheel 67 which in turn will impart rotation to the vehicle wheel W to be tested and at a rate above the critical speed. Upon release of the spinner, the wheel will coast down through the critical speed, the resonant condition of vibration being sensed by the pickup 14 and relayed to the interpreter unit for recording on the unbalancing meter M. Of course, pickup 14 adjacent the wheel being tested is selectively switched into the interpreter unit E for determining static or kinetic unbalancing forces in the wheel. The stroboscopic lamp SL is arranged to be fired by the unbalancing forces being detected by the pickup such that the lamp will fire once for every revolution of the wheel. Accordingly, the stroboscopic lamp will flash once each revolution of the wheel and the light from the lamp will be directed onto the rotating wheel and may be selectively adjusted by the operator to pick up a check point placed on the wheel. When at the speed of greatest unbalance or resonant speed, this check point will become especially noticeable and will have the appearance of being stationary, notwithstanding the high speed of rotation of the wheel. After noting the position of the check point the operator may brake the wheel and correct the static unbalance condition by the addition of a weight on the outside rim of the wheel. As mentioned, the arms 87, successively used, serve to block out many of the extraneous vibrations, and the pickup bar due to its pivotal, resilient manner of supporting the pickups 14 together with its hollow configuration provides for close and accurate sensing by the pickups, thereby eliminating much of the trial and error in correcting unbalanced conditions.

To determine dynamic unbalance in the wheel, the spinner S is again brought up to engage the tire and by switching the circuit by means of switch SW from the kinetic to the dynamic position the pickup 14 opposite the wheel being tested is connected and the other pickup is disconnected. The stroboscopic lamp SL is again caused to fire once each revolution with the unbalancing forces being translated into the form of a signal by the opposite pickup 14 and relayed into the interpreter unit E, from which the necessary correction may be made to the wheel.

The operation is essentially the same for the companion wheel at the front end. However, in the rear end wheel balancing operation the flippers 45 are selectively actuated into the upstanding position so as to engage and support the rear axle of the vehicle at spaced points on either side of the differential housing. As previously stated, the arms 87 are employed in conjunction with the flippers although in the absence of a differential lock it is only necessary to employ the flipper units 45 and again vibrations are effectively transmitted through the flippers into the pickup bar 12 for sensing by the pickup unit 14. In rear end balancing operations, of course rotation of the wheel is accomplished by the engine instead of the spinner S, but braking may again be accomplished by use of the brake assembly B when desired to stop rotation of the vehicle wheel for the placing of weights thereon.

In the use of the balancing apparatus as described, it will be evident that one assembly may be employed to balance all the wheels on the vehicle notwithstanding the type of differential and variation in wheel base and weight of the vehicle. Of course, if desired, a pair of assemblies may be utilized only to avoid the necessity of moving first the front wheels then the rear wheels into position on the balancing apparatus. It will be further apparent that by rigidly mounting the pickup bar 12 through the lift member 13 for selective engagement with the under side of the vehicle, vibrations developed in the vehicle frame will be effectively transmitted by the bar into the pickups 14 without the necessity of employing individual resilient support means. Of course the advantage of employing a rigid pickup bar is that it is compact and is effective to accurately direct the vibrations developed into the pickup unit mounted thereon. Moreover, selective use of the blocking arms 87 together with the flippers has been found to greatly expedite the overall balancing operation and furthermore to make the entire assembly extremely compact yet conformable for all types of balance tests.

It is therefore to be understood from the foregoing that various changes and modifications may be made in the construction and arrangement of the balancing apparatus of the present invention without departing from the scope thereof as defined by the appended claims.

What is claimed is:

1. In a balancing apparatus adapted to detect static and dynamic unbalance in vehicle wheels, a unitary lift support member having an oblong hollow pickup bar dimensioned for extension along the width of the underside of the vehicle, lift means extending angularly and downwardly from said bar to provide for vertical adjustment thereof into selective engagement with the underside of the vehicle whereupon said bar serves to support the vehicle while being free to vibrate in response to the vibrations developed therein, and pickup means arranged at opposed ends of said bar for disposition adjacent to the vehicle wheels when said bar is moved into engagement with the underside, said pickup means being selectively and individually responsive to vibrations transmitted through said bar by unbalancing forces in each vehicle wheel when rotated and to transmit signals corresponding to the vibration developed for detection by said apparatus.

2. In a balancing apparatus adapted to detect the state of static and dynamic unbalance in vehicle wheels, a base, a hydraulically actuated lift support comprising a tubular pickup bar of generally rectangular cross section dimensioned for extension long the width of the underside of the vehicle, a lift member extending rearwardly from the intermediate portion of said bar and being pivotally connected to said bar and to the base for said lift support, a cylinder extending forwardly from pivotal connection with the lift member adjacent to the base, pickup means mounted at opposed ends within said bar being selectively and individually responsive to vibrations developed by unbalancing forces upon rotation of each vehicle wheel, and straddle support means pivotally mounted on said bar being movable into upwardly projecting, rigid disposition for engagement with the rear end axle portion in spaced relation to the differential housing 3. In a balancing apparatus according to claim 2 wherein said straddle support means are defined by a pair of flippers pivotally mounted in spaced relation on said bar with means interconnecting said flippers being operative to cause upward swinging movement of said flippers into upstanding vertical position, and means on said base aligned with said flippers to cause downward swinging movement of said flippers as said bar is lowered away from engagement with the vehicle.

4. A balancing apparatus for detecting the state of unbalance in each of a pair of companion vehicle wheels comprising a base, a resiliently supported pickup bar with lift means to selectively raise and lower said bar into and out of engagement with the underside of the vehicle between each pair of companion wheels, said bar incorporating therein vibration sensitive means at opposed ends thereof selectively and individually responsive to vibrations developed from unbalancing forces in each vehicle wheel when rotated to transmit signals corresponding to the vibrations developed, a stroboscopic light source and indicating means responsive to the signals transmitted by said vibration sensitive means, spin means operative to rotate each wheel to be tested, together with brake means positioned in alignment with the wheels to brake the rotation thereof, and blocking members positioned for movement into engagement with the underside of the vehicle between said pick-up bar and each vehicle wheel.

5. In a balancing apparatus for detecting the state of unbalance in each of a pair of companion wheels mounted on a vehicle, a base, a lift support having a pickup bar and means to selectively raise and lower said bar into and out of engagement with the underside of the vehicle for lifting each pair of wheels, said bar incorporating therein vibration sensitive means at opposed ends thereof selectively and individually responsive to vibrations developed from unbalancing forces in each vehicle wheel when rotated, straddle support means on said bar for selective movement into an upwardly projecting position to engage the axle portion of the rear wheels on a vehicle on opposed sides of the differential, means to rotate and brake a wheel to be tested, and pivotal blocking arms on said base being independently movable into engagement with the underside of the vehicle between the vibration sensitive means and each wheel not being tested so as to effectively absorb extraneous vibrations developed by that wheel when rotating and testing the other wheel.

6. A balancing apparatus for detecting the condition of unbalance in each of a pair of front and rear companion wheels on a vehicle comprising a base including a lateral guide portion and a chock disposed thereon, a lift support having an oblong pickup bar, a pivotally mounted lift member to selectively raise and lower said bar into and out of engagement with the underside of the vehicle between each pair of vehicle wheels, a pair of flippers mounted in spaced relation on said bar, said bar incorporating therein vibration sensitive means at opposed ends thereof selectively and individually responsive to vibrations developed, a stroboscopic light source and indicating means responsive to the signals transmitted by said vibration sensitive means, spin means movable along said lateral guide being operative to rotate each wheel to be tested, together with brake means positioned in alignment with the wheels to brake the rotation thereof, and a pair of blocking means on said base each being independently movable into engagement with the underside of the vehicle between one of said vibration sensitive means and the vehicle wheel not being tested so as to effectively block extraneous vibrations developed in that wheel upon rotation and testing of the opposite companion wheel.

7. In a balancing apparatus for detecting the state of static and dynamic unbalance in vehicle wheels in mounted relation on a vehicle wherein there is provided means for rotating each wheel to be tested, a stroboscopic light source for viewing a check point on the wheel being tested together with indicating means associated with the light source for indicating the magnitude of vibrations picked up, the combination therewith of a unitary lift support member including a resiliently-supported oblong bar dimensioned for extension along the width of the underside of the vehicle with means to selectively raise and lower said bar into and out of engagement with the underside of the vehicle between each pair of companion wheels, said bar incorporating therein vibration sensitive means at opposed ends thereof being responsive to vibrations developed from unbalancing forces in each vehicle wheel when rotated to transmit signals corresponding to the vibrations developed for transmission to the indicating means and stroboscopic light source, and straddle support means pivotally mounted on said bar adjacent each pickup means and being movable into upwardly projecting, rigid disposition for engagement with the rear end axle portion.

References Cited in the file of this patent

UNITED STATES PATENTS

| 2,429,930 | Foresman | Oct. 28, 1947 |
| 2,700,892 | Lowe | Feb. 1, 1955 |
| 2,722,829 | Ringering | Nov. 8, 1955 |
| 2,782,641 | Allen | Feb. 26, 1957 |
| 2,783,648 | Stovall et al. | Mar. 5, 1957 |
| 2,798,379 | Merrill et al. | July 9, 1957 |

OTHER REFERENCES

Pages 53–56, Mechanics for Engineering Students, by John E. Younger, published in 1940 by International Textbook Press, Scranton, Pa.